March 4, 1930.  O. F. KEISER  1,749,636
ANTISKID CROSS MEMBER
Filed Aug. 10, 1929  2 Sheets-Sheet 1
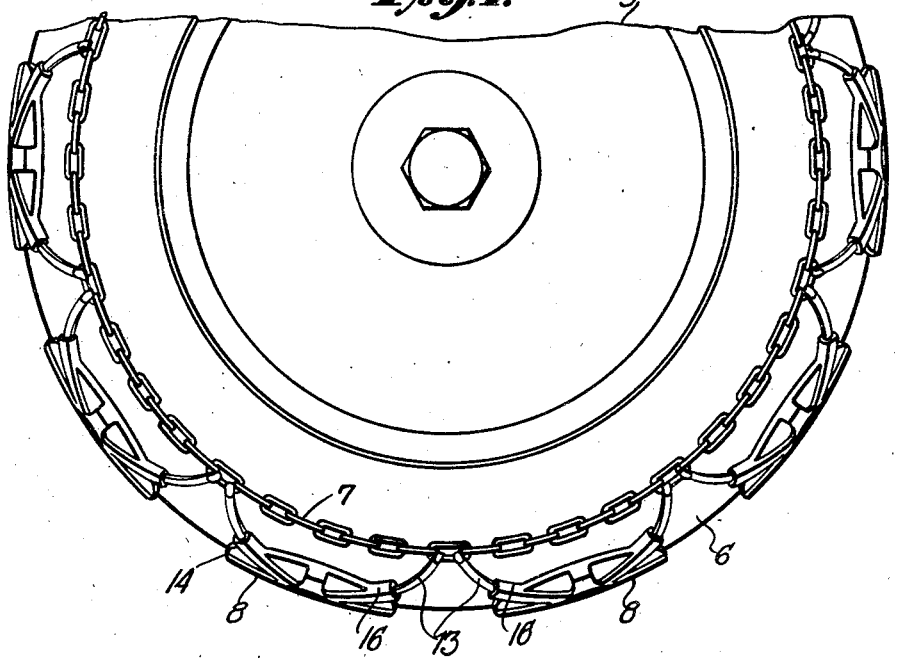
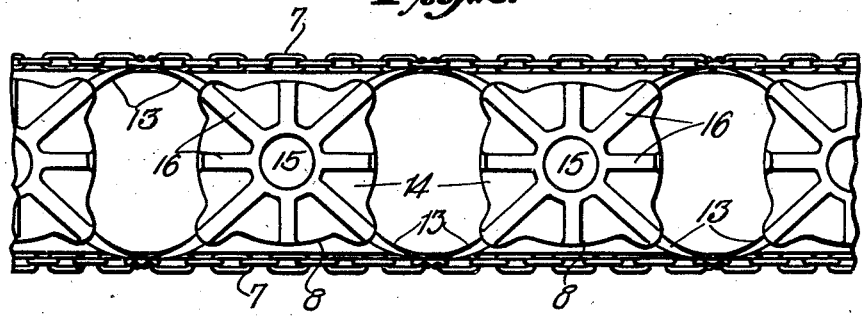
Inventor
OLIVER F. KEISER.
By *Clarence A. O'Brien*
Attorney March 4, 1930.  O. F. KEISER  1,749,636
ANTISKID CROSS MEMBER
Filed Aug. 10, 1929   2 Sheets-Sheet 2

Inventor
OLIVER F. KEISER.
By Clarence A. O'Brien
Attorney

Patented Mar. 4, 1930

1,749,636

UNITED STATES PATENT OFFICE

OLIVER F. KEISER, OF BARNESVILLE, PENNSYLVANIA

ANTISKID CROSS MEMBER

Application filed August 10, 1929. Serial No. 384,982.

This invention relates to anti-skid chains and has more particular reference to an antiskid cross member especially applicable for use on pneumatic tires of motor vehicle wheels, the primary object of the invention being the provision of improved cross members adapted to rest upon the periphery of the tire, and secured on the tire through the medium of a pair of chains disposed one on each side of the tire, said cross members being arranged in circumferentially spaced relation about the outer periphery of the tire in somewhat the same manner as the ordinary cross chain of the conventional non-skid tire chain.

A still further object of the invention is the provision of ground engaging member adapted to be used in conjunction with the regular tire chain and to be substituted in lieu of the usual cross chain, which is now almost universally used, and the use which at the present time is prohibited on some thoroughfares.

A still further object of the invention is to provide a skid chain of this character which will not mar or tear up roads or streets but which will present an effective gripping action on the road to prevent skidding of the vehicle in icy weather, or on muddy roads or streets.

A still further object of the invention is to provide an anti-skid device of this nature, which when used with the ordinary annular side chains of the conventional skid chains, will insure comfortable riding of the vehicle, protect the tire while in use, render better service than has hereinbefore been obtained from skid devices, will be strong, durable, thoroughly reliable, practical and efficient in operation.

Figure 3:
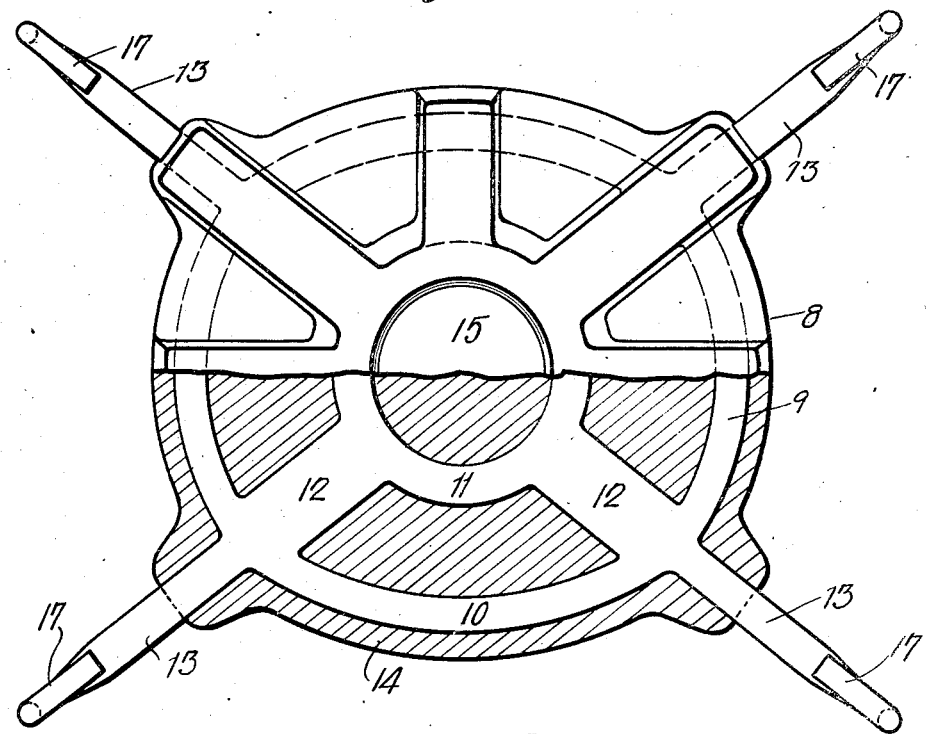
Figure 4:
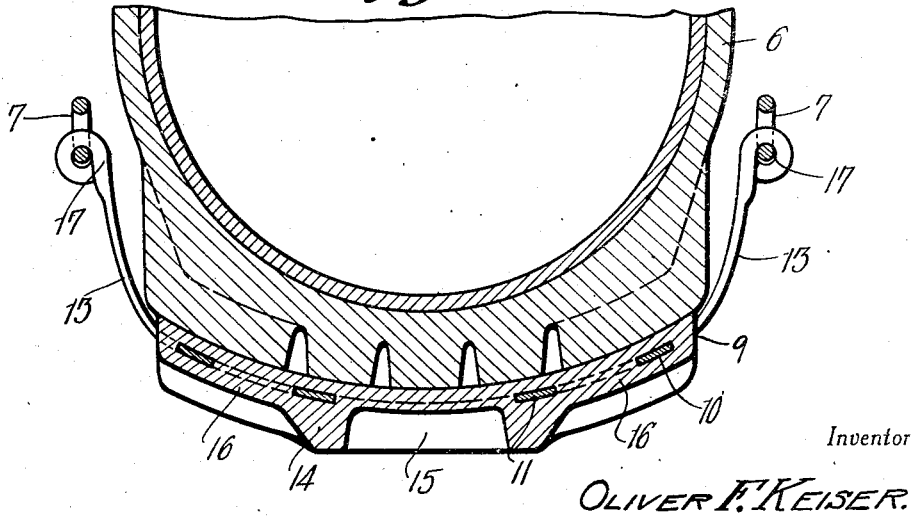

Other objects and advantages of the invention will become apparent during a study of the following description, taken in connection with the accompanying drawings wherein:

Figure 1 is a fragmentary side view of a conventional vehicle wheel and tire therefor, the same being equipped with my improved anti-skid chain, Figure 2 is a fragmentary top plan view of the skid chain constructed in accordance with the present invention, Figure 3 is a top plan view of the cross member or ground engaging member of the skid chain, parts being broken away to fully illustrate the construction of the same, and Figure 4 is a transverse vertical section through a pneumatic tire and the ground engaging member of my improved anti-skid chain.

With reference more in detail to the drawings, it will be seen that I have designated a conventional vehicle wheel by the reference character 5, the same being equipped with the usual pneumatic tire 6.

As comprehended by this invention, the anti-skid device consists of a pair of side chains 7—7 to which are secured therebetween in a manner to be hereinafter more fully set forth my improved cross members or ground engaging element of the chain designated generally by the reference character 8.

Of course it is to be understood that the number of these members 8 to be used depends upon the size of the tire on which the chain is to be used. The members 8 are adapted to be disposed on the outer periphery of the tire in spaced circumferential relation, and in cross section these members 8 are curved to conform to the shape of the tire.

As shown to advantage in Figure 3 each of the members 8 comprise a skeleton frame 9 formed of metal or any other suitable and durable material. The skeleton frame 9 consists of an outer somewhat oval shaped frame portion and an inner annular ring like member 11 which is connected to the outer member 10 through the medium of connecting members or arms 12 of flat form which connecting members 12 radiate from the annulus 11 as shown. This frame may be made all in one piece, the different elements of the frame as enumerated being stamped out in any well known manner.

Extending from each corner of the frame are attaching arms 13—13. The skeleton frame is encased in a suitable covering of rubber or composition of rubber and fabric 14, which covering is of the desired thickness. In the preferred construction, the covering is molded on the frame, since it is the purpose of this invention to manufacture and sell the device all in one piece.

On its outer face and concentric with the ring 11 the covering is so molded as to provide a centrally disposed raised annular flange 15 forming a vacuum cup on the member 8.

In forming this vacuum cup, the rubber is so molded as to build up this vacuum cup, and on its same face, the cover is provided with built up ribs of rubber 16 which ribs radiate from the vacuum cup 15 as their common center.

The upper surfaces of the face of the ribs 16 are somewhat flush with the upper edge of the vacuum cup 15 as clearly illustrated.

The arms 13 of the skeleton frame project outwardly from the rubber covering, and these arms are uncovered as shown to advantage in Figure 4. These arms are suitably bent or twisted as to conform to the curvature of the sides of the tire, and at their outer ends, the arms terminate in thickened ends 17, which ends may be first inserted in the links of the cross chain and then bent upon themselves for hooked engagement with the links of the chain as clearly shown.

Manifestly, in assembling the entire chain upon the tire, the members 8 rest on the outer periphery of the tire and the side chains 7—7 extend on opposite sides of the tire.

As will be noted by a study of Figure 2, the arms 13 extending from the corners of the members 8 at opposed ends of the members engage with the same links of the side chains 7, since the length of these arms 13 are such that when the members are so arranged the space therebetween is sufficient. However, these members 8 may be spaced one from the other at any desired distance depending upon circumstances.

In practical use, the cup shaped depression 15 will act not only as a cushion for the wheel, but in engaging the ground will tend to effect suctional engagement with the ground thus greatly tending to reduce skidding of the vehicle wheel.

Furthermore the ribs 16 will also act in conjunction with the vacuum cup 15 for cushioning the tire so that from the foregoing it will be seen that an antiskid cross member constructed in accordance with the invention, will act not only in the single capacity of preventing skidding, but at the same time will act as a cushion for the tire thus insuring smooth easy riding of the vehicle equipped with a skid chain using such ground engaging devices.

Even though I have herein shown and described the preferred embodiment of my invention, it is to be understood that the same is susceptible of changes fully comprehended by the spirit of the invention, and the scope of the appended claim.

Having thus described my invention, what I claim as new is:

An anti-skid device of the class described comprising a metallic skeleton frame including an outer frame member, a centrally disposed ring within the frame member and spaced therefrom, radiating arms integrally connected, at their opposite ends, to the opposed edges of the frame member and the ring, and means radiating from the frame member for securing the skeleton frame in position on a tire, and comprising a covering of resilient material encasing the skeleton frame, including a centrally disposed annular flange projecting from the outer face of the covering above the ring and concentric therewith and providing a suction cup on the covering, and ribs formed on the outer face of the covering radiating from the annular flange and extending parallel with and above the arms of the skeleton frame toward the marginal edges of the covering.

In testimony whereof I affix my signature.

OLIVER F. KEISER.